(12) United States Patent
Yamamura

(10) Patent No.: US 7,665,770 B2
(45) Date of Patent: Feb. 23, 2010

(54) ALL TERRAIN VEHICLE

(75) Inventor: Takashi Yamamura, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 202 days.

(21) Appl. No.: 11/142,597

(22) Filed: Jun. 1, 2005

(65) Prior Publication Data
US 2006/0273572 A1 Dec. 7, 2006

(51) Int. Cl.
B60P 3/22 (2006.01)
F02M 37/00 (2006.01)
B60K 5/12 (2006.01)

(52) U.S. Cl. .................. 280/835; 123/509; 180/291

(58) Field of Classification Search .......... 137/590, 137/565.01, 565.17; 73/290 R; 123/509; 280/835; 180/291
See application file for complete search history.

(56) References Cited

U.S. PATENT DOCUMENTS

| 4,741,362 A | * | 5/1988 | Smola | 137/587 |
| 5,701,853 A | * | 12/1997 | Takahashi | 123/41.33 |
| 6,253,790 B1 | * | 7/2001 | Hara | 137/565.17 |
| 6,655,363 B2 | * | 12/2003 | Kobayashi et al. | 123/509 |
| 7,089,917 B1 | * | 8/2006 | McKinster et al. | 123/509 |
| 2002/0038737 A1 | * | 4/2002 | Morishita et al. | 180/291 |
| 2002/0112907 A1 | * | 8/2002 | Maeda et al. | 180/69.4 |
| 2004/0129708 A1 | * | 7/2004 | Borchert et al. | 220/562 |
| 2005/0045399 A1 | * | 3/2005 | Kudo et al. | 180/219 |
| 2005/0126546 A1 | * | 6/2005 | Yagisawa | 123/509 |
| 2005/0173918 A1 | * | 8/2005 | Eguchi et al. | 280/834 |
| 2005/0279330 A1 | * | 12/2005 | Okazaki et al. | 123/509 |
| 2006/0272872 A1 | * | 12/2006 | Isoda | 180/68.3 |
| 2007/0023218 A1 | * | 2/2007 | Koike et al. | 180/219 |

FOREIGN PATENT DOCUMENTS

| JP | 2003040175 A | * | 2/2003 |
| JP | 2004-308602 | | 11/2004 |
| JP | 2005069231 A | * | 3/2005 |

* cited by examiner

Primary Examiner—Lesley Morris
Assistant Examiner—Daniel Yeagley
(74) Attorney, Agent, or Firm—Keating & Bennett, LLP

(57) ABSTRACT

An all terrain vehicle includes a frame, an engine unit suspended from the frame, a fuel tank mounted on the frame, and a fuel pump disposed within the fuel tank. A protrusion protruding downward is provided on a bottom surface of the fuel tank and at a portion opposing a fuel suction vent of the fuel pump. The protrusion is arranged so that the protrusion opposes a throttle body connected to the engine unit.

8 Claims, 13 Drawing Sheets

ALL TERRAIN VEHICLE

BACKGROUND OF THE INVENTION

1. Field of the Invention

The present invention relates to the field of all terrain vehicles (ATVs) More particularly, the present invention relates to the placement of a fuel tank and a fuel pump in a structure in which the fuel pump is disposed within the fuel tank.

2. Description of the Background Art

In these types of all terrain vehicles, for example, the type described in the Japanese laid-open document 2004-308602, an engine is mounted within the vehicle body frame, a saddle type seat is provided at the rear side of the engine, and a fuel tank is disposed below the saddle type seat. The fuel tank is arranged such that when viewed from the width direction of the vehicle, the fuel tank appears to be on the right side of a muffler, while when viewed from the front-rear direction of the vehicle, the fuel tank appears to be on the rear side of a rear suspension.

In addition, according to the Japanese laid-open document 2004-308602, a depression portion protruding from below is formed on the bottom wall of the fuel tank, and an absorption vent of the fuel pump is provided within the depression portion.

In the case of such a conventional vehicle where the fuel tank is disposed on the right side of the muffler and rear side of the rear suspension, in order to prevent the fuel tank from being heated by the muffler and interfered with by the rear suspension, a gap is to be provided between the fuel tank and the muffler and between the fuel tank and the rear suspension. As a result, the capacity of the tank is constrained.

Alternatively, to avoid such capacity constraint, the fuel tank can also be disposed in front of the seat and above the engine. However, in order to avoid interfering with the engine and depending on how the fuel tank is disposed, the location of the fuel tank may become inconveniently high.

SUMMARY OF THE INVENTION

In order to solve the problems described above, preferred embodiments of the present invention provide an all terrain vehicle having a fuel tank that has adequate capacity but it not provided at a high location. Also, preferred embodiments of the present invention provide an all terrain vehicle having a consistent supply of fuel even when the fuel level within the fuel tank varies due to traveling on rough terrain.

According to a preferred embodiment of the present invention, an all terrain vehicle includes a frame, an engine unit suspended from the frame, a fuel tank mounted on the frame, and a fuel pump disposed within the fuel tank, where a protrusion protruding downward is provided on a bottom surface of the fuel tank and at a portion opposing a fuel suction vent of the fuel pump, and the protrusion is arranged so that the protrusion opposes a throttle body connected to the engine unit.

According to the all terrain vehicle of a preferred embodiment of the present invention, since the protrusion protruding downward is disposed on the bottom wall of the fuel tank and opposes the throttle body connected to the engine unit, the dead space between the engine unit and the connection portion of the throttle body is utilized by providing the protrusion therein. As a result, even when the fuel level within the fuel tank varies due to traveling in rough terrain, fuel can be supplied stably, and the capacity of the tank can also be maintained without increasing the height of the position of the fuel tank.

These and other elements, features, aspects, characteristics and advantages of the present invention will be further described in the following detailed description of preferred embodiments of the present invention when taken in conjunction with the accompanying drawings.

DETAILED DESCRIPTION OF PREFERRED EMBODIMENTS

Figure 1:
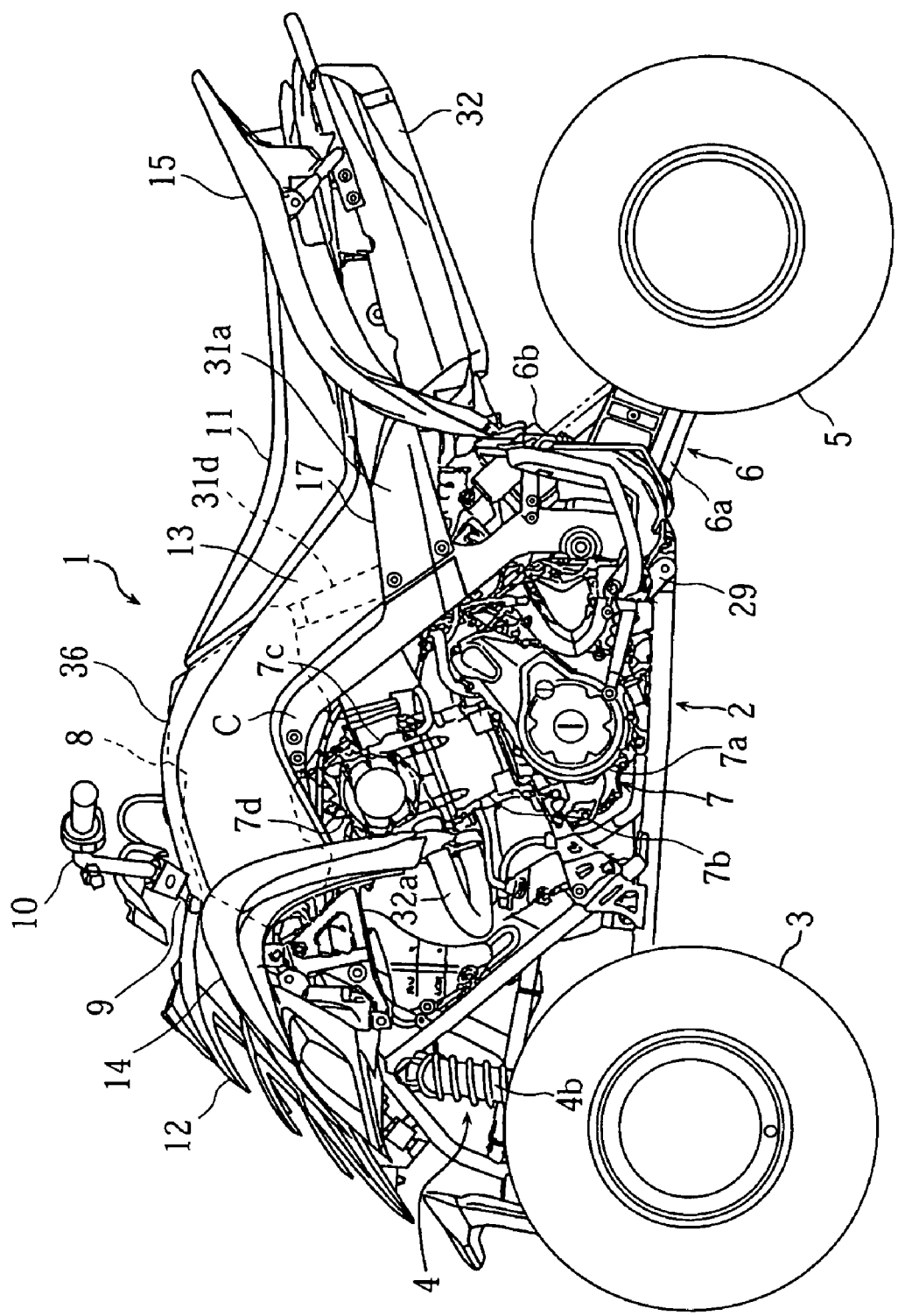
FIG. 1 is a side view of an all terrain vehicle according to a preferred embodiment of the present invention.
Figure 2:
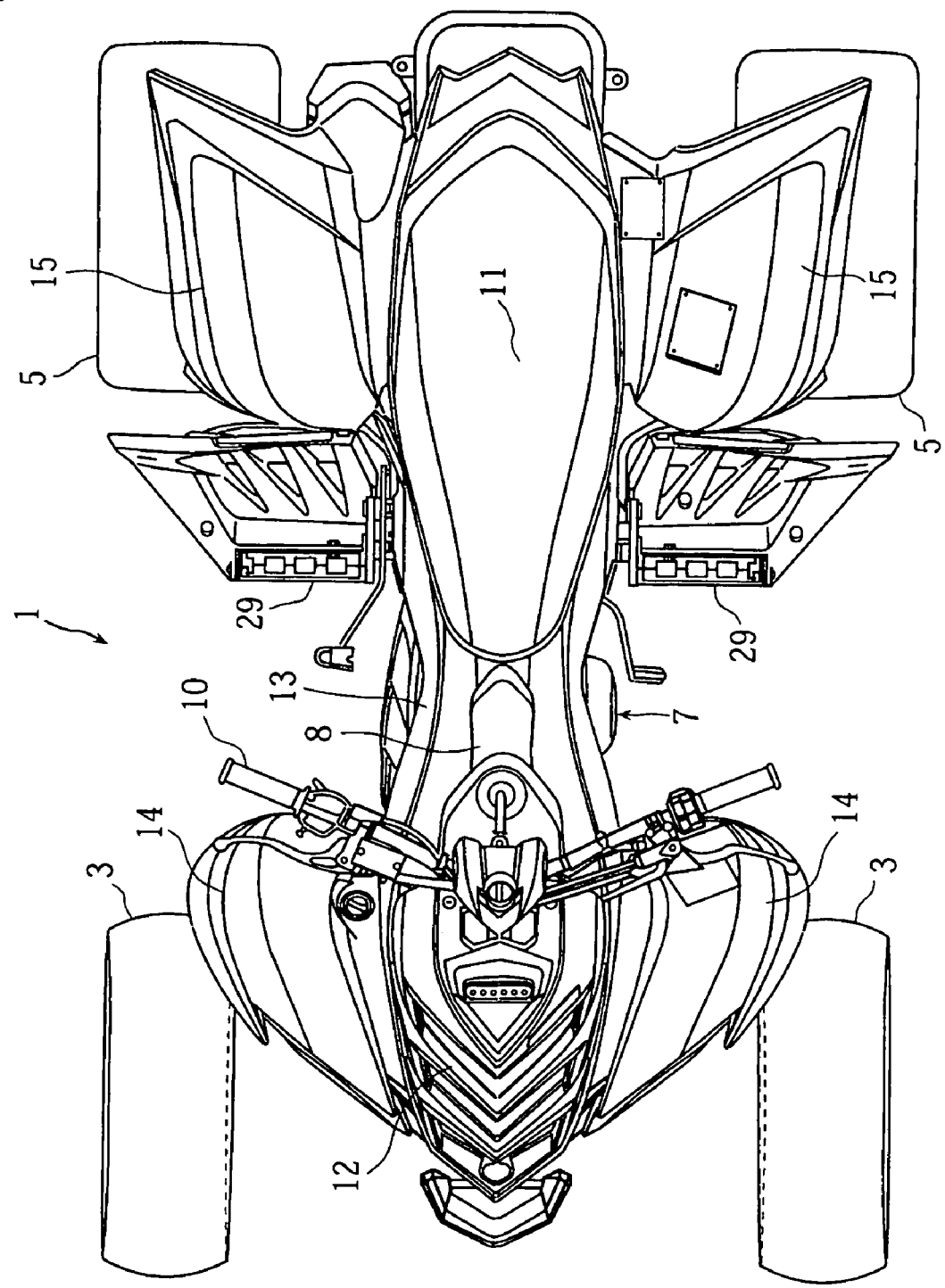
FIG. 2 is a top view of the all terrain vehicle.
Figure 3:
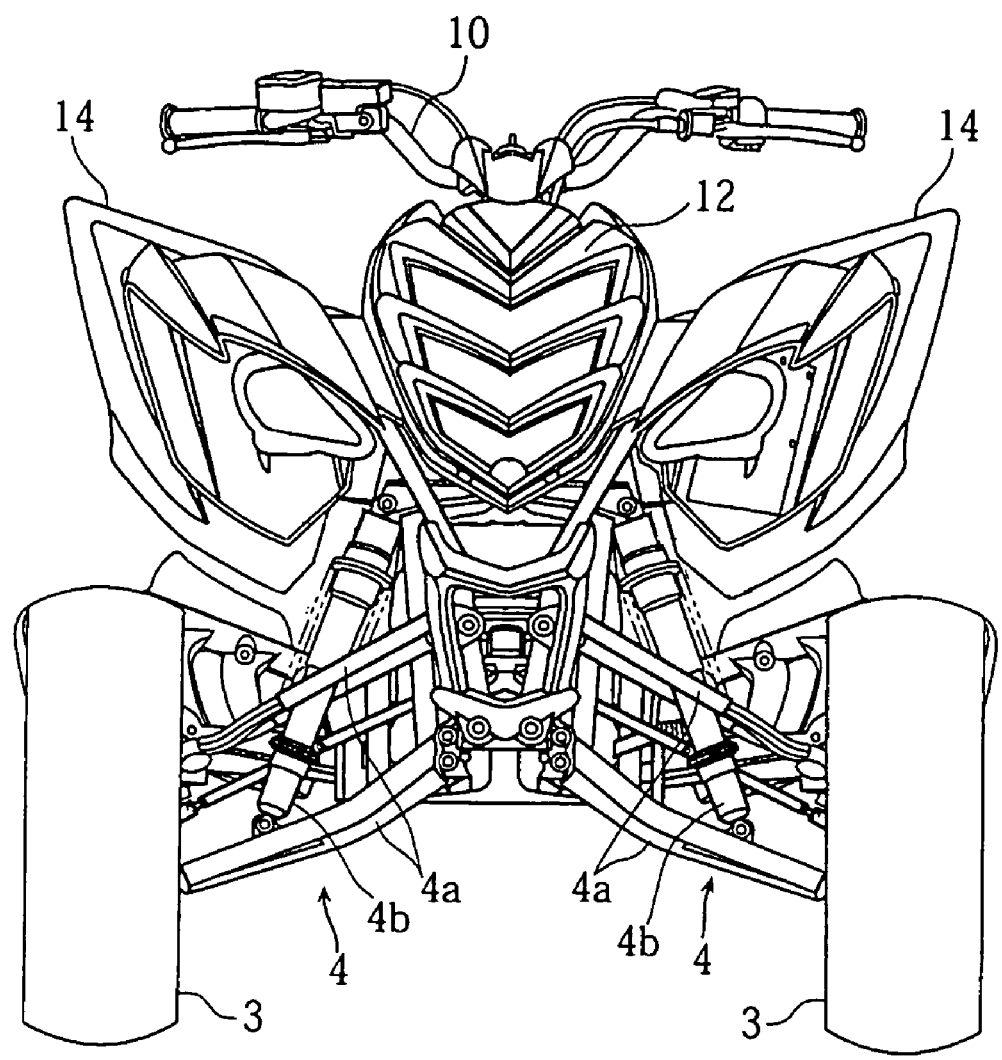
FIG. 3 is a front view of the all terrain vehicle.
Figure 4:
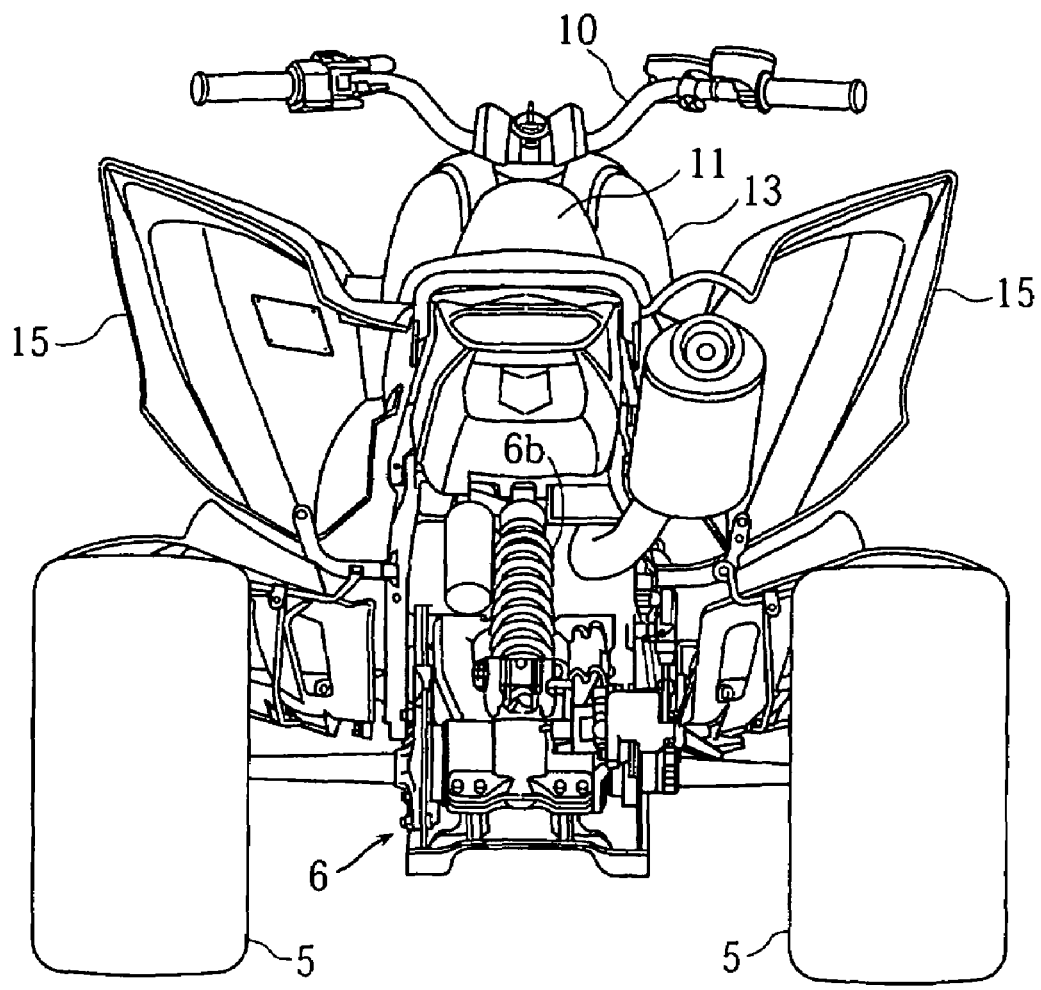
FIG. 4 is a rear view of the all terrain vehicle.

Hereinafter, preferred embodiments of the present invention will be described with reference to the accompanying figures.

FIGS. 1 to 17 are illustrations of an all terrain vehicle according to a preferred embodiment of the present invention. In the present preferred embodiment, any reference to a direction or side such as "front", "before", "rear", "behind", "right", or "left" indicates such a direction or side as viewed by a rider who is seated on a seat of the vehicle.

Throughout the figures, reference numeral 1 denotes an all terrain vehicle, which is generally structured as follows. At the front end of a double-cradle-type body frame 2, right and left front wheels 3 are supported at the right and left sides, so as to be capable of moving up and down, respectively via right and left front wheel suspension devices 4. Each of the right and left front wheels 3 preferably has a low-pressure and wide balloon tire attached thereon. At the rear end of the body frame 2, right and left rear wheels 5, which are similar to the front wheels 3, are supported via a rear wheel suspension device 6 so as to be capable of moving up and down.

In a cradle of the body frame 2, an engine unit 7 is mounted. A fuel tank 8 is mounted above the engine unit 7. At the front of the fuel tank 8, a steering rod 9 with which to steer the right and left front wheels 3 is mounted so as to be capable of pivoting right or left. Steering handles 10 are affixed to an upper end of the steering rod 9. Behind the fuel tank 8 is mounted a seat 11.

Furthermore, a front cover 12 is arranged so as to cover the steering rod 9 at the front. The right and left sides of the fuel tank 8 and the lower right and left sides of the seat 11 are covered by a side cover 13. Furthermore, right and left front fenders 14 are mounted respectively above the right and left front wheels 3, and right and left rear fenders 15 are mounted respectively above the right and left rear wheels 5.

Each front wheel suspension device 4 supports each front wheel 3 via upper and lower front arms 4a, which in turn are supported by a front portion of the body frame 2 so as to be capable of moving up and down. A cushion unit 4b is located between the body frame 2 and the lower front arms 4a.

The rear wheel suspension device 6 supports each rear wheel 5 via a rear arm 6a, which in turn is supported by a rear portion of the body frame 2 so as to be capable of moving up and down. A cushion unit 6b is located between the rear arm 6a and the body frame 2, in a middle position along the vehicle width direction.

The vehicle body fame 2 preferably includes a main frame 16 to which the engine unit 7 is mounted, and a seat rail 17 to which the seat 11 is fixed. The main frame 16 is preferably a double cradle type frame of which left and right frame members are joined to each other via a plurality of cross members (not shown in drawings) connected by welding. Furthermore, the bottom portion of the fuel tank 8 is disposed between the left and right frame members of the main frame 16.

The main frame 16 preferably includes a frontal sub-frame 18 made of steel pipes and a rear sub-frame 19 made of cast aluminum material, for example, and both are joined to each other by bolts or other fastening members so that they can be detached. The joint member between the frontal and rear sub-frames 18, 19 of the main frame 16 is slightly curved towards the inner side of the vehicle along the width direction, and such curved portion serves as a knee grip c for rider seating on the seat 11 to grip with the knees.

The seat rail 17 is preferably made of cast aluminum material for supporting the weight of the rider sitting on the seat 11. When viewed from the top, the seat rail 17 is preferably approximately rectangular in shape. A frontal part 31d extending upward is joined to the front part of the seat rail 17, and a support boss portion 31e for supporting the rear portion of the fuel tank 8 is located on top of the frontal part 31d.

The engine unit 7 has a general structure joined together by bolts or other fastening members, that includes a transmission case containing a transmission and a crankcase 7a containing a crankshaft. The transmission case is integrally formed at the rear portion of the engine unit 7, while the upper wall of the front portion of the crankcase 7a is stacked by a cylinder block 7b, a cylinder head 7c, and a head cover 7d. The engine unit 7 is mounted in such a way that it inclines forward and upwardly along a cylinder axis L1.

An exhaust port opening is formed on the front wall of the cylinder head 7c, and an exhaust pipe 32a is connected to the exhaust port. The exhaust pipe 32a extends to the rear and is attached to a large-diameter muffler 32 disposed along the seat rail 17.

An aspiration port opening is formed on the rear wall of the cylinder head 7c, and a throttle body (aspiration passage) 33a of an aspiration mechanism 33 is connected to the aspiration port from behind and slightly above. The throttle body 33a includes a throttle valve (not shown in drawings), which controls the surface area of the aspiration passage, and a fuel injection valve 33b.

The fuel injection valve 33b is joined to the upper wall of the throttle body 33a from the rear and inclines upward, and injects fuel towards the aspiration port. A fuel supplying rail 33c, which is approximately horizontally disposed along the vehicle width direction, is connected to a fuel inlet at the top of the fuel injection valve 33b. One end of the fuel supplying rail 33c is connected to a fuel pump 34 (described below), which is provided within the fuel tank 8, via a fuel supplying hose 33d.

An air cleaner 71 is further joined to the throttle body 33a by an aspiration duct 35 extending from the throttle body 33a to the rear. The air cleaner 71 is disposed below the seat 11.

The air cleaner 71 includes a case 72 that is preferably made of resin in which a filtration element (not shown in drawings) is provided. The case 72 is integrally joined with an air introduction duct 72d. The air introduction duct 72d extends diagonally towards the front along a forward and upwardly inclining front portion 11a of the bottom plate of the seat, and an opening 72e is located approximately at the same height as the top of the engine unit 7.

The fuel tank 8 is located in front of the seat 11, between the left and right frontal sub-frame 18, and on top of the engine unit 7. The bottom surface of the fuel tank 8 is covered by a damper plate (not shown in the drawings) suspended across the left and right frontal sub-frame 18 and having an insulating function. The top-rear portion of the fuel tank 8 includes a portion covered by the front portion 11a of the seat and a portion covered by a tank cover 36.

The fuel tank 8 preferably includes a tank 37, which is preferably formed by resin blow molding, and a pump installation member 38. The tank 37 is molded such that when viewed from the top, the front portion has a smaller width than the back portion. The back portion has a shape that corresponds to the shape of the above mentioned curved portion of the main frame 16 and constitutes a portion of the knee grip c (see FIG. 6).

Figure 5:
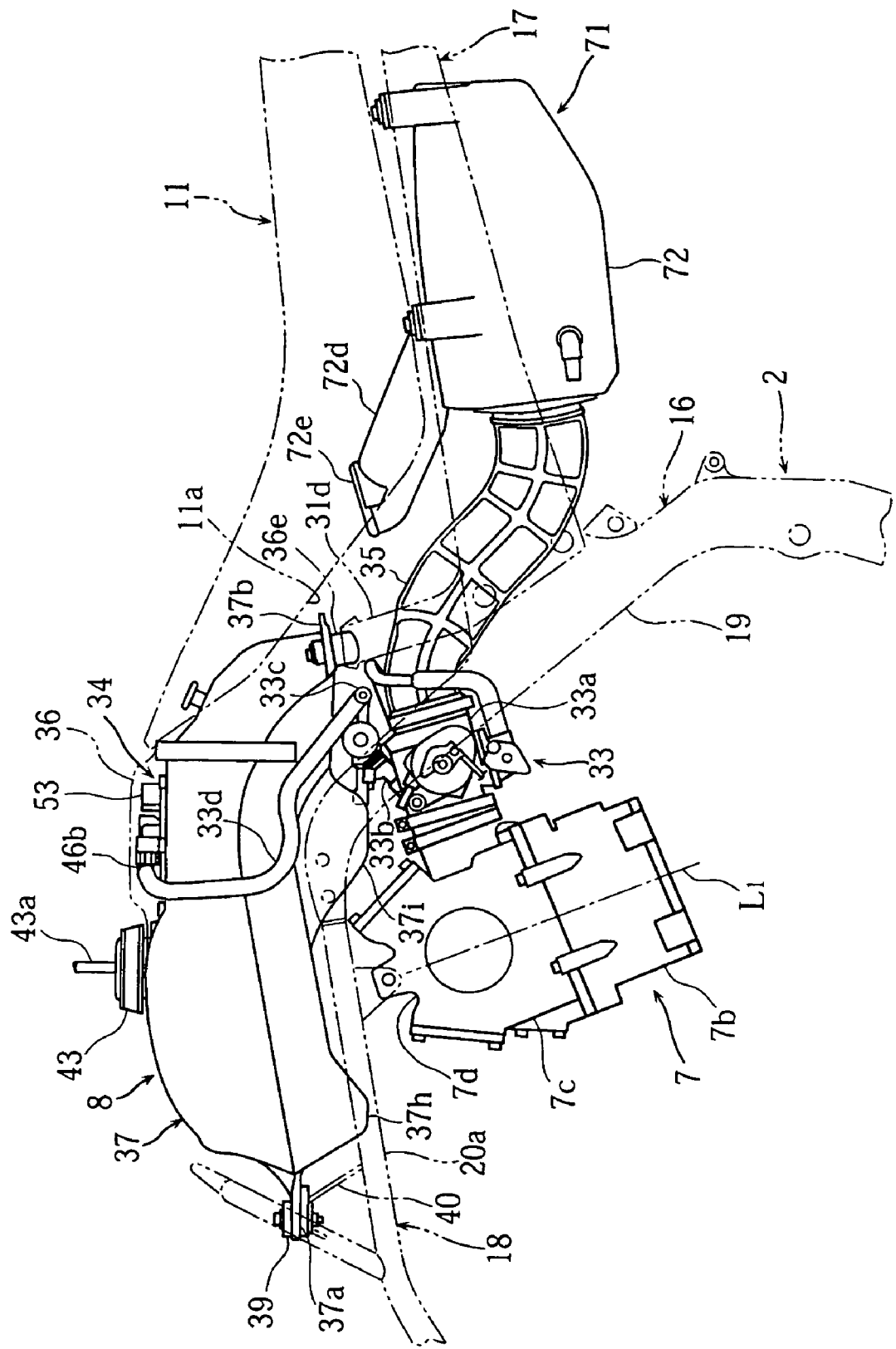
FIG. 5 is a side view of a fuel tank of the all terrain vehicle.
Figure 6:
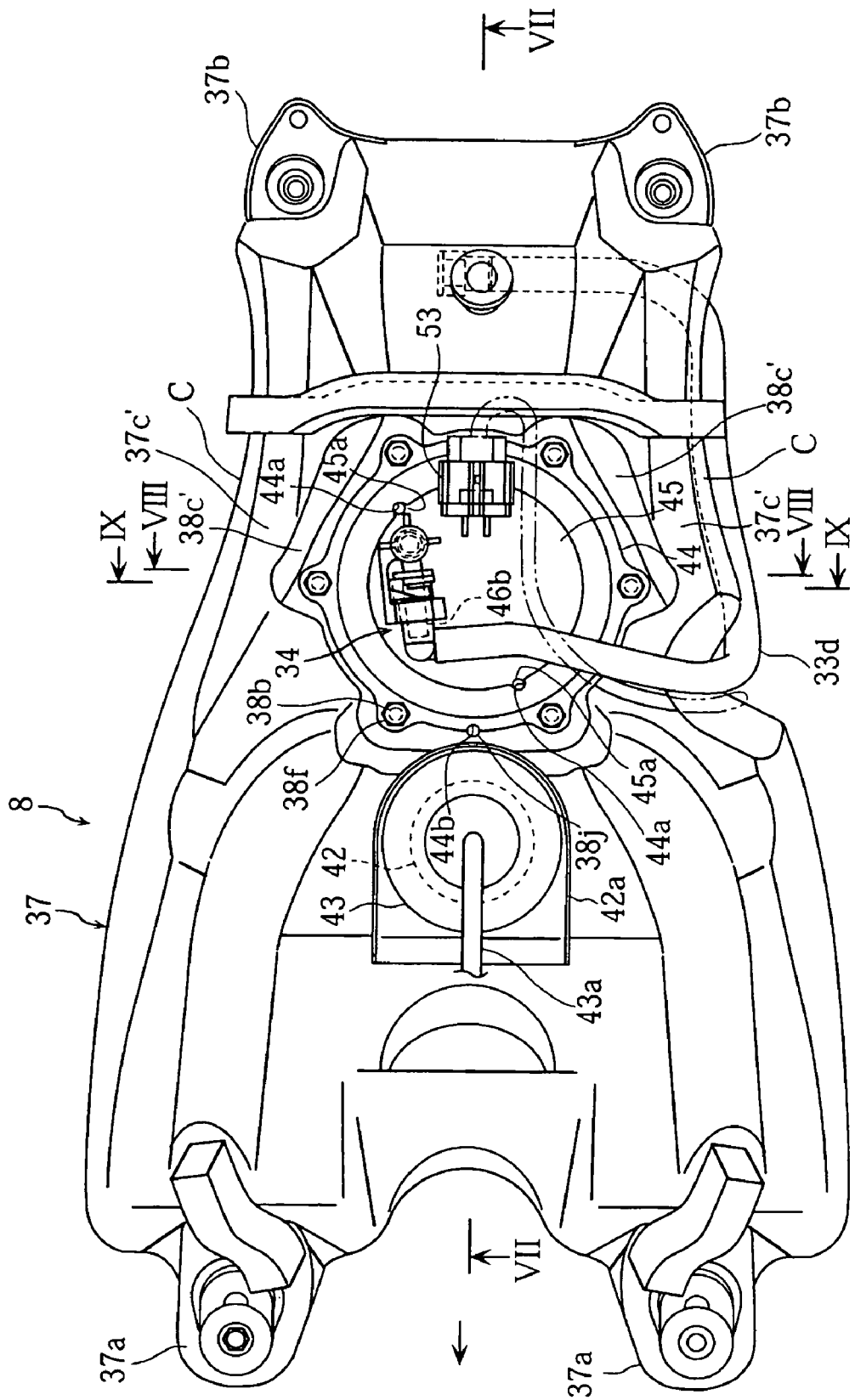
FIG. 6 is a top view of the fuel tank.
Figure 7:
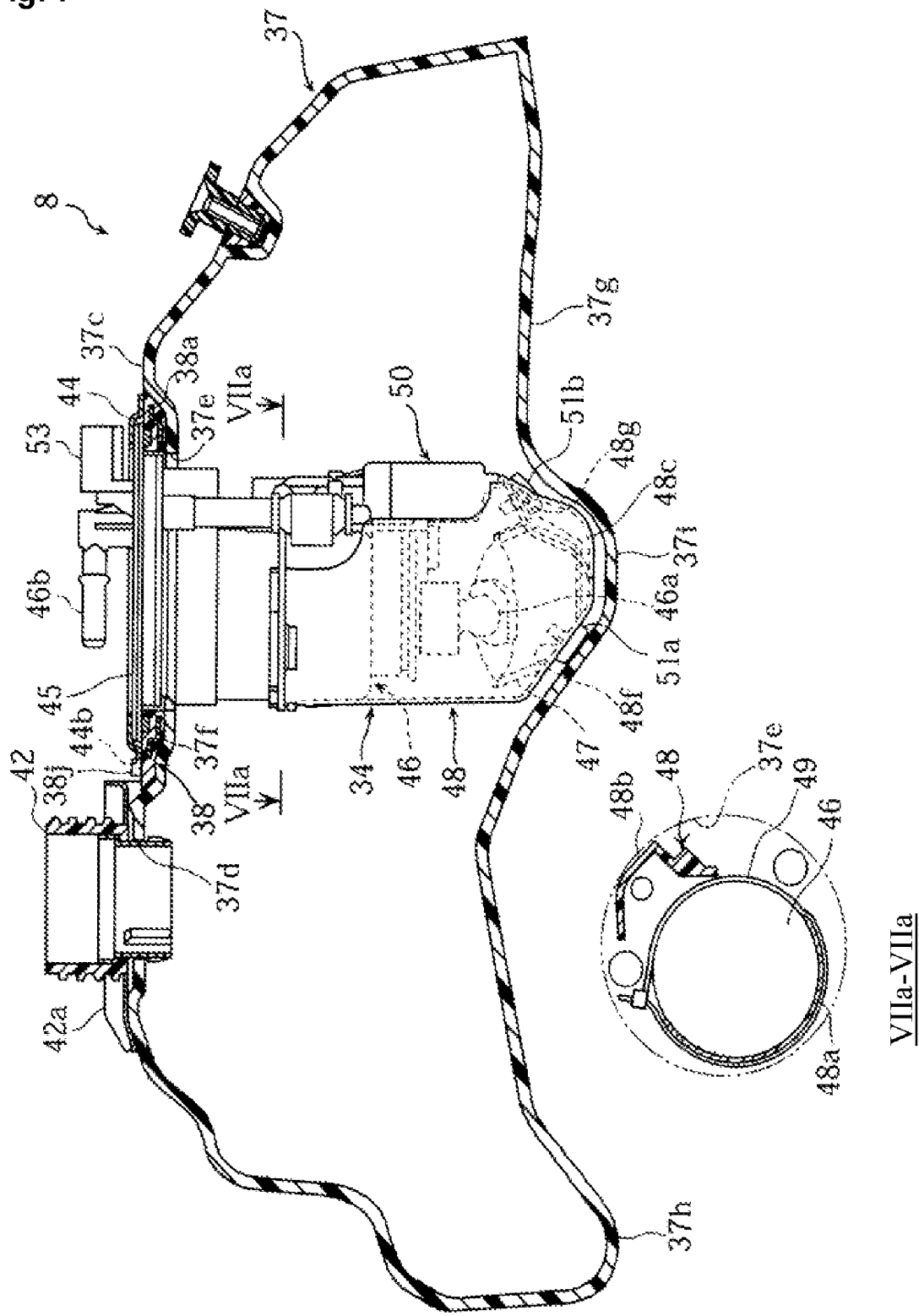
FIG. 7 is a cross-sectional view (cutting across the dotted line VII-VII in FIG. 6) of the fuel tank.
Figure 10:
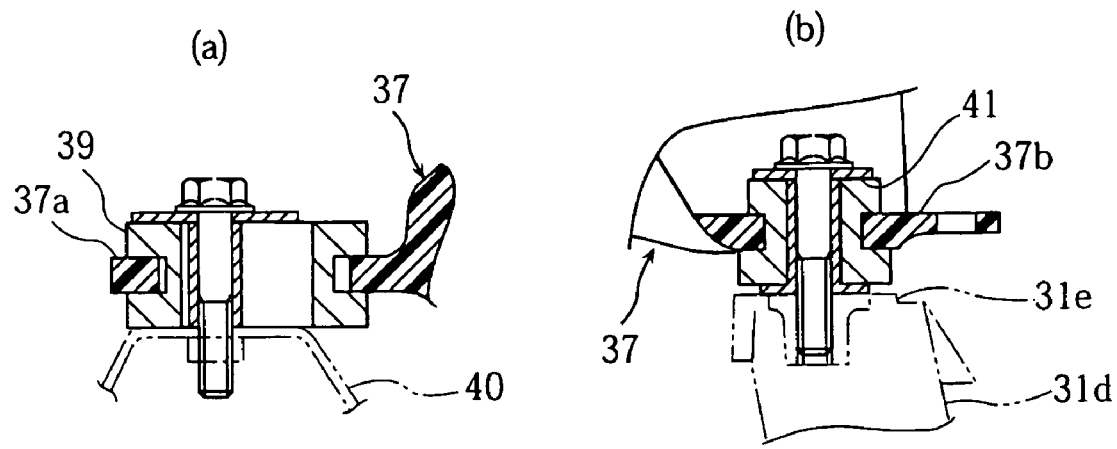
FIG. 10 is a cross-sectional view of a pump installation member of the fuel tank.
Figure 11:
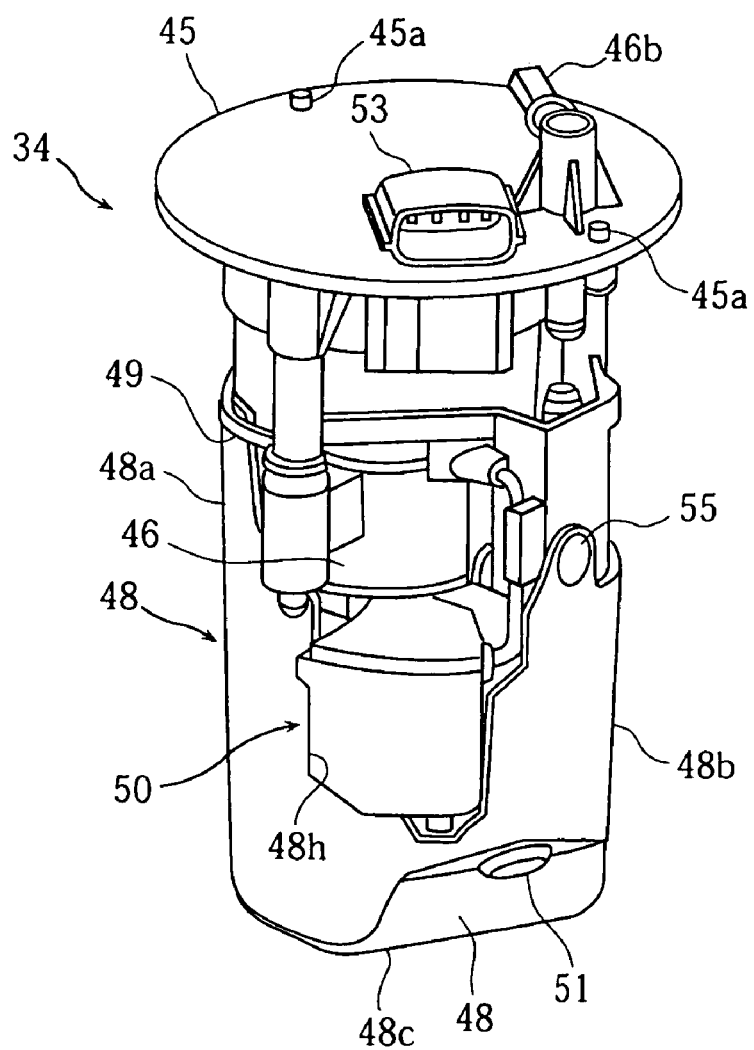
FIG. 11 is a perspective view of an entire fuel pump of the fuel tank.
Figure 12:
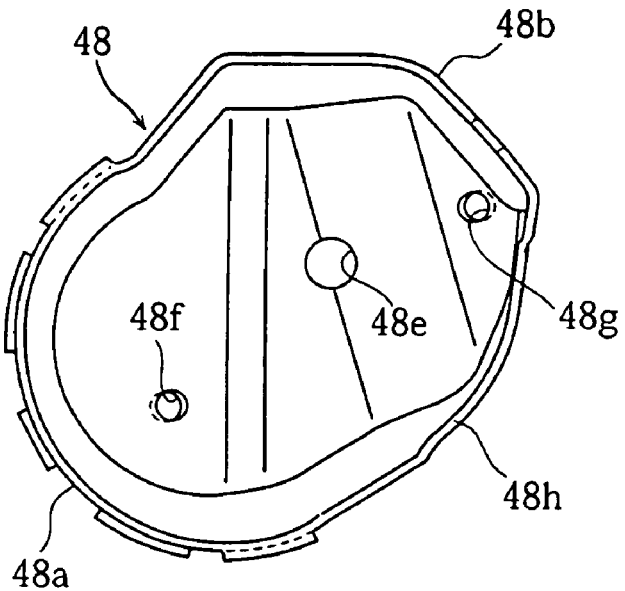
FIG. 12 is a top view of a pump cover of the fuel tank.
Figure 13:
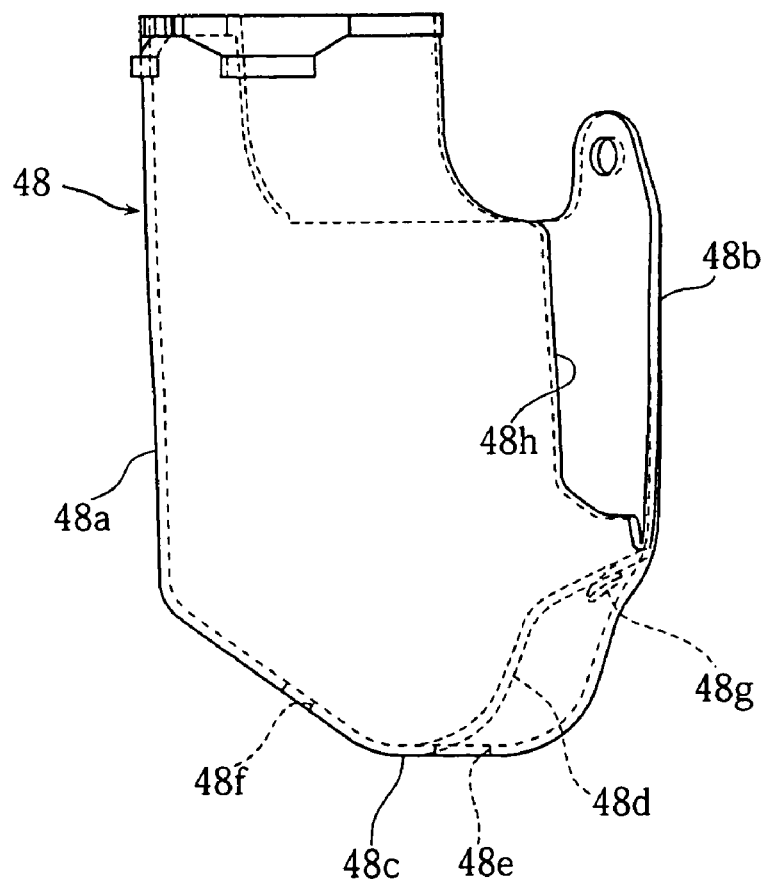
FIG. 13 is a side view of the pump cover.

Frontal left-right installation members 37a and rear left-right installation members 37b are integrally joined to the tank 37. As illustrated in FIGS. 5 and 10, each (left and right) frontal installation member 37a is fixed onto a bracket 40, which is connected to the frontal sub-frame 18, via a grommet 39 by a bolt. In addition, each (left and right) rear installation member 37b is fixed onto the support boss portion 31e on the frontal part 31d of the seat rail 17 via a grommet 41 by a bolt.

A fuel introduction vent 37d is formed in front of a pump connection opening 37e with a specific interval in an upper wall portion 37c of the tank 37. The size of the pump connection opening 37e approximately spans the entire width of the tapered upper wall portion 37c (see FIG. 8). Moreover, the peripheral region 37f of the pump connection opening 37e is positioned lower than the top surface of the upper wall portion 37c.

A barrel-shaped inlet 42 having a damper plate 42a is connected to the fuel introduction vent 37d, and the inlet 42 is covered by a removable cap 43. Additionally, an air removal hose is indicated by reference number 43a.

The pump installation member 38 is fixed to the peripheral region 37f of the pump connection opening 37e. The pump installation member 38 includes a disc-shaped metal flange plate 38a opposing the peripheral region 37f of the pump connection opening 37e, a bolt 38b welded to the flange plate 38a at a specific angle and interval, and a resin layer 38c covering the entire surface of the flange plate 38a and the top part of the bolt 38b. In other words, the resin layer 38c is molded in such a way that the entire surface of the flange plate 38a and the top part of the bolt 38b are completely covered by the resin layer 38c. Furthermore, the resin layer 38c is adhered to the peripheral region 37f during blow molding of the tank 37, thereby integrally joining the pump installation member 38 to the tank 37.

Figure 8:
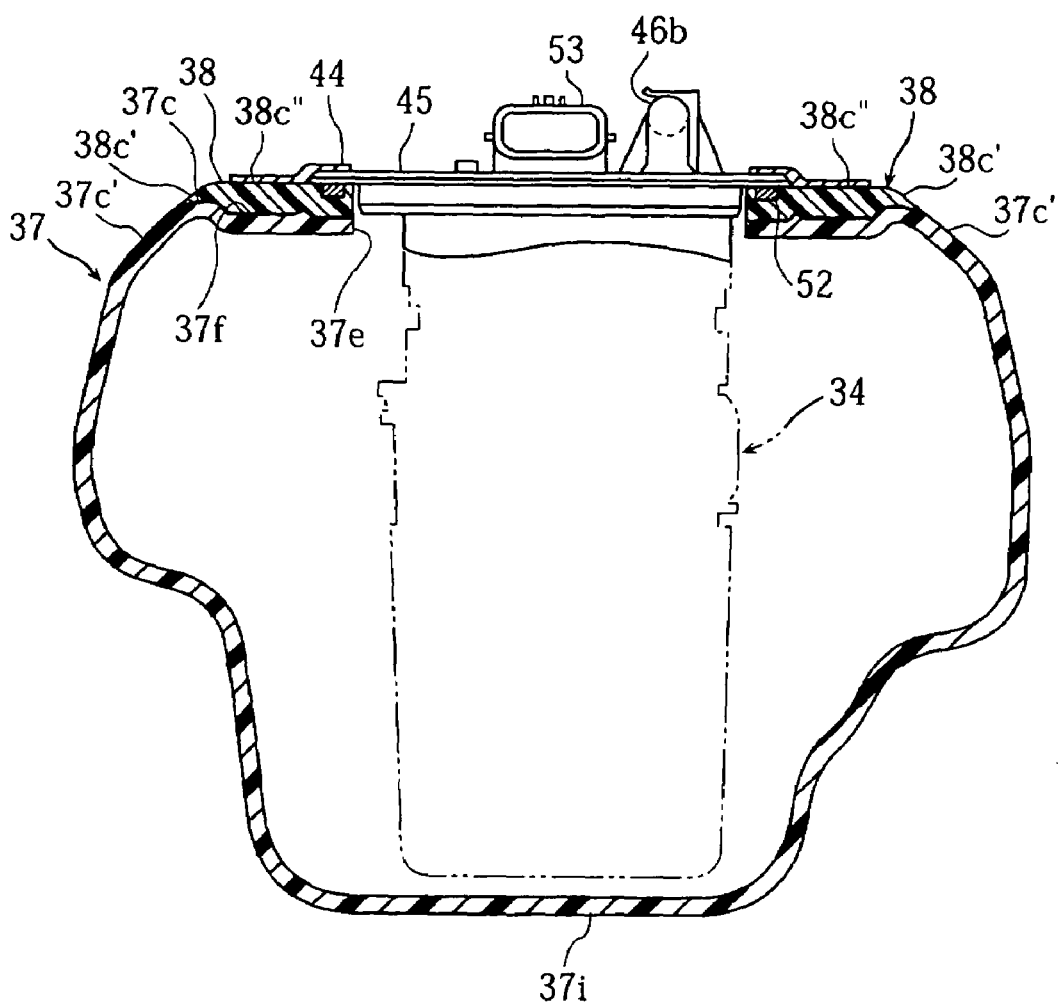
FIG. 8 is a cross-sectional view (cutting across the dotted line VIII-VIII in FIG. 6) of the fuel tank.
Figure 9:
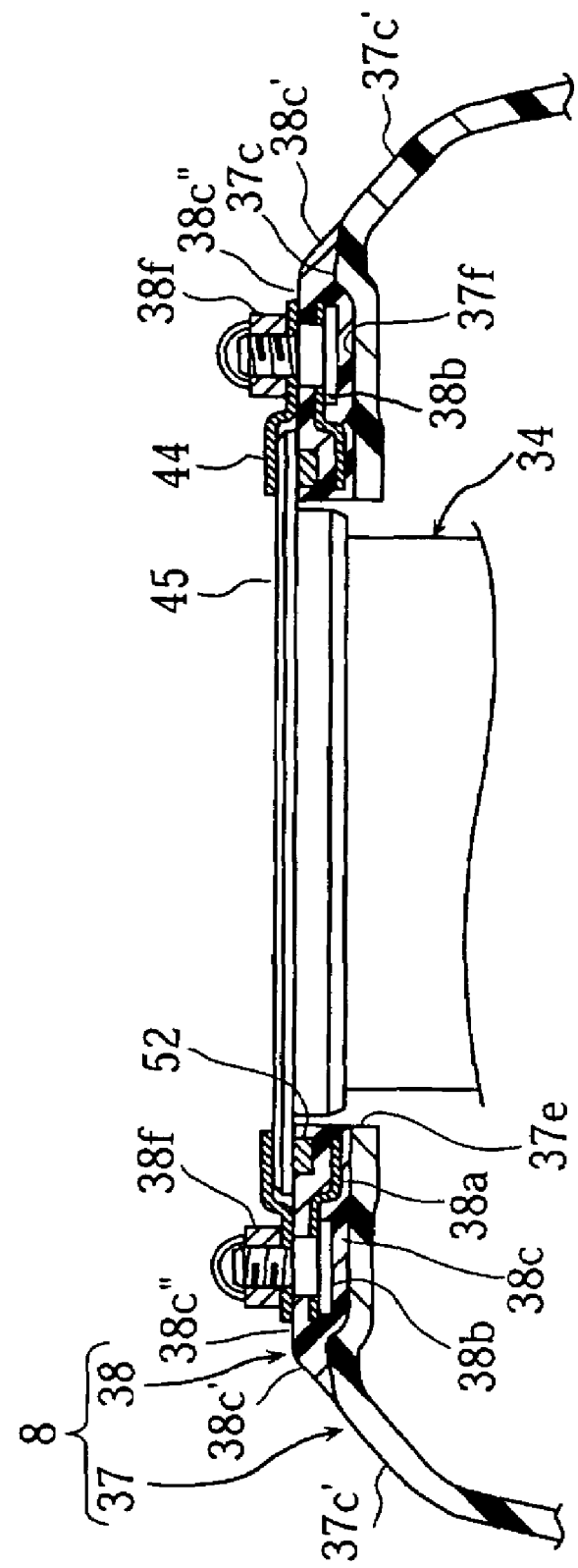
FIG. 9 is a cross-sectional view of the part illustrated by the IX-IX line in FIG. 6.

As shown in FIGS. 8 and 9, left and right corner wall surfaces 37c' located on the outer side of the peripheral region 37f of the pump connection opening 37e decline downward such that they intersect with upper surfaces 38c" of the resin layer 38c. In addition, left-right wall surfaces 38c' of the resin layer 38c decline downwardly such that the left-right wall surfaces 38c' are continuous with the left-right corner wall surfaces 37c'. The left-right corner wall surfaces 37c' of the tank 37 therefore decline from the immediate border of the left-right upper surfaces 38c" of the resin layer 38c. As a result, the width of the tank can be reduced accordingly and the knee grip c can have a moderate width even though the fuel pump 34 is provided between the knee grip c.

The fuel pump 34 is preferably inserted into the pump connection opening 37e of the tank 37. The fuel pump 34 is also air-tightly joined to the resin layer 38c by connecting a flange 45, which is provided on top of the fuel pump 34, to the top surface of the resin layer 38c with a seal member 52 interposed therebetween, providing a disc-shaped securing flange 44 on the flange 45 and inserting the bolt 38b through the securing flange 44, thereafter screwing a nut 38f to the bolt 38b.

The fuel pump 34 includes a suction vent 46a having a filter 47, and a discharging vent 46b for discharging fuel that has been sucked in via the suction vent 46a and pressurized. The discharging vent 46b protrudes from the top of the flange 45 and is connected to the fuel supplying hose 33d.

The drive mechanism of the pump 46 is connected to a coupler 53 fixed to the top of the flange 45 via a lead wire (not shown in drawings). The tank cover 36 is arranged such that it covers the coupler 53 and the top portion of the discharging vent 46b.

Additionally, protrusions 45a are provided in specific locations on the peripheral region of the flange 45 to engage recess portions 44a provided in the securing flange 44. Furthermore, another recess portion 44b is formed in the securing flange 44 to engage a protrusion 38j provided in a specific location on the pump installation member 38. Thus, the location of the fuel pump 34 within the tank 37 is fixed (see FIGS. 6 and 7).

The lower portion of the fuel pump 34 is covered by a pump cover 48. The pump cover 48 is preferably substantially cylindrical in shape with a base and an open top. When viewed from the side, the pump cover 48 includes a crescent part 48a attached to an outer rim on the front side of the pump 46, an extending portion 48b extending from the crescent part 48a towards the rear, and a bottom portion 48c that tapered downward. The extending portion 48b preferably includes a liquid level detector 50 describes below.

The pump cover 48 is fixed onto the pump 46 by a clamp 49 clamping on the upper portion of the crescent part 48a such that the position of the pump cover 48 can be adjusted along the height of the pump 46. The pump cover 48 is further supported by a securing mechanism 55 so that the pump cover 48 does not rotate around the pump 46. Thus, errors during production and assembling can be avoided.

The suction vent 46a and the filter 47 are disposed at the bottom portion 48c of the pump cover 48. A cavity 48d that curves inward is formed at the rear part of the bottom portion 48c, and a fuel vent 48e is formed at the bottom of the bottom portion 48c. Openings 48f and 48g are formed at the front side and rear side of the bottom portion 48c, respectively, and the openings 48f and 48g are respectively inserted with a plug 51a and 51b. In addition, the plug 51a at the front side is connected to a bottom wall portion 37g of the tank 37 and defines a gap with the pump cover 48.

Thus, even if foreign matter drops into the tank 37 during refueling, for example, since a gap exists between the bottom wall portion 37g of the tank 37 and the bottom portion 48c of the pump cover 48, the foreign matter can be prevented from being absorbed by the filter 47, and problems such as clogging can be avoided.

Another extending portion 37h extending downward is provided at the frontal part of the bottom wall portion 37g of the tank 37. The extending portion 37h is located at the front side of the head cover 7d of the engine unit 7. The extending portion 37h increases the surface area of the front wall of the tank 37, and thus improves air cooling of fuel during traveling while increasing the capacity of the tank.

A protrusion 37i protruding downward is provided at a part opposing the suction vent 46a on the bottom wall portion 37g of the tank 37. The bottom portion 48c of the pump cover 48 is located within the protrusion 37i and absorbs fuel within the protrusion 37i.

The protrusion 37i is located approximately at the center of the tank 37 along the front-rear direction. Specifically, the protrusion 37i is located slightly behind the center of the tank 37 along the front-rear direction and approximately at the center of the bottom surface of the fuel tank along the vehicle width direction, and has a larger width than the fuel pump.

The protrusion 37i is also arranged such that it opposes the throttle body 33a connected to an outer wall portion of the cylinder head 7c of the engine unit 7. More specifically, the protrusion 37i is located at an empty depression formed by the rear wall of the cylinder head 7c and head cover 7d, the throttle body 33a and the fuel injection valve 33b (see FIG. 5). Additionally, when viewed from the cross-section of the vehicle width, the protrusion 37i is located between the left-right frames of the main frame 16 along the width direction and lower than the main frame 16 along the top-bottom direction.

The fuel pump 34 preferably includes the liquid level detector 50 for detecting the fuel level within the fuel tank 8. The liquid level detector 50 mainly includes, as illustrated in FIGS. 14-17, a thermistor 56 and a thermistor casing 57 enclosing the thermistor 56.

The thermistor 56 preferably includes a case 56a housing a thermistor element 56b, and the thermistor element 56b is connected to a lead wire 56c extending out of the case 56a. The thermistor possesses a positive temperature resistance characteristic such that when the temperature increases, the resistance decreases.

The thermistor casing 57 is located in the protrusion 48b of the pump cover 48. The thermistor casing 57 is provided near the bottom portion 48c of the protrusion 48b, and an indentation 48h taking the shape of the thermistor casing 57 is located above the cavity 48d. The thermistor is disposed such that part of it is exposed out of the indentation 48h within the tank and attached to the fuel pump 34.

The thermistor casing 57 is composed of a main body 58 with an opening at the top and a cover 59 covering the opening. A slot 58a having a tubular shape with edges is provided on the outer wall of the main body 58 of the casing. The cover 59 on which a lug 59a is provided is secured onto the main body 58 of the casing by engaging the lug 59a to the slot 58a (see FIG. 16).

A supporting rod 60 is inserted into the main body 58 of the casing, and a lower end portion 60a of the supporting rod 60 is inserted into a boss portion 58d, which is provided in the bottom wall 58c of the casing's main body 58 and extending downward. Additionally, an upper portion 60b of the supporting rod 60 extends through an opening 57a, which is at a boundary between the main body 58 of the casing and the cover 59, leading to the exterior and fixed to the flange 45.

The thermistor 56 is supported by a clamp 61 which is in turn fixed to the supporting rod 60. In addition, the lead wire 56c leading to the exterior from the thermistor 56 is connected to the coupler 53.

Partitions 58b and 59b are attached to the main body 58 of the casing and the cover 59 so as to separate the interior of the thermistor casing 57 into a thermistor housing chamber A for housing the thermistor 56 and a fuel introduction chamber B for introducing fuel within the fuel tank 8.

A fuel vent 58e is provided in the bottom wall 58c of the fuel introduction chamber B. In addition, a cavity 58f is formed on the interior side of the bottom wall 58c, and another fuel vent 58g is located at the bottom of the cavity 58f. Fuel flowing from each of the fuel vent 58e and 58g is led into the thermistor housing chamber A through the fuel introduction chamber B.

An air vent 57b is disposed around the opening 57a of the cover 59. Additionally, the fuel vents 58e and 58g are arranged such that the sum of their surface areas is larger than the surface area of the air vent 57b.

Figure 14:
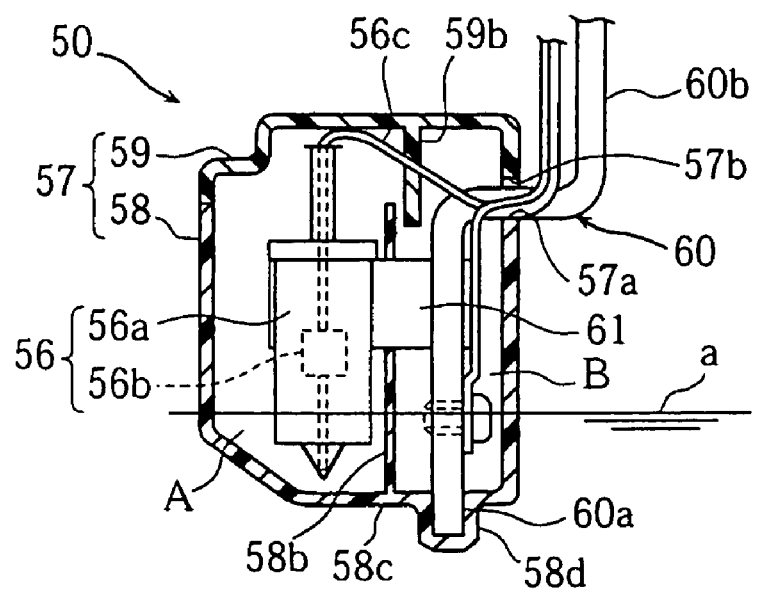
FIG. 14 is a cross-sectional view of a liquid level detector of the fuel tank.
Figure 15:
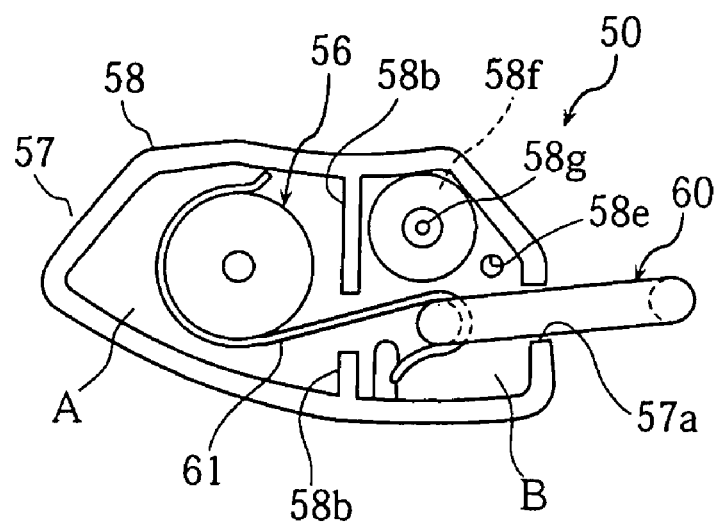
FIG. 15 is a top view of the liquid level detector.
Figure 16:
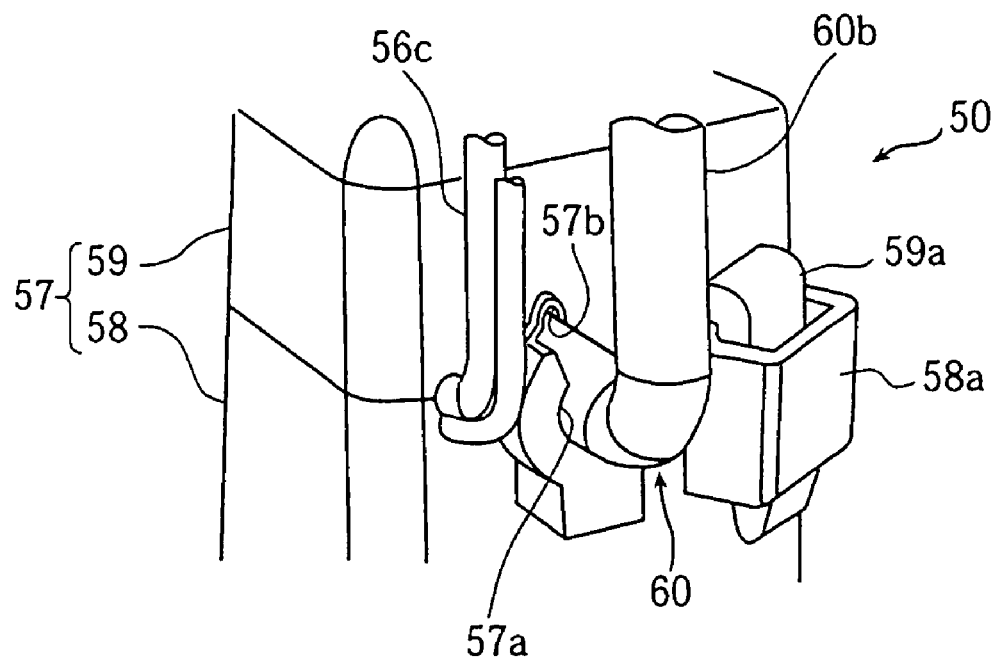
FIG. 16 is a perspective view illustrating the main parts of the liquid level detector.
Figure 17:
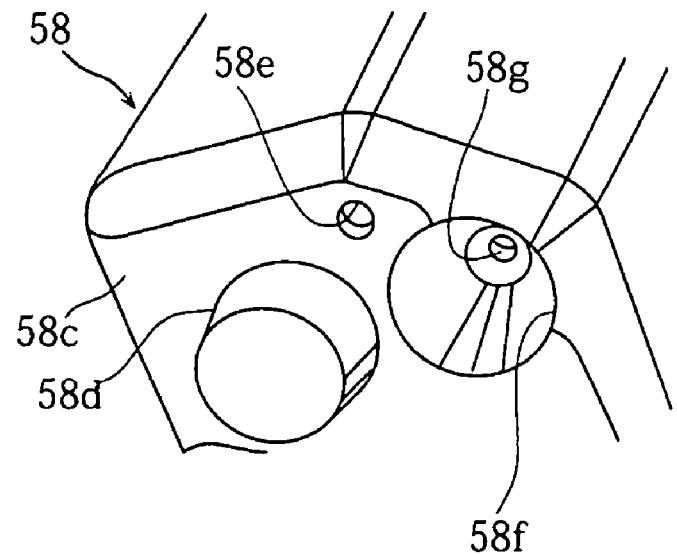
FIG. 17 is a perspective view illustrating the bottom portion of the liquid level detector.

When the level of the fuel within the fuel tank 8 is at a level higher than the thermistor element 56b, the thermistor element 56b will be cooled by the fuel and the resistance increases, causing substantially no current flow. Therefore, the light of the fuel indicator (not shown in drawing) will remain off. As represented in FIG. 14, when the level of the fuel is lower than the thermistor 56b, the resistance increases due to the increase in temperature of the thermistor 56b, thus causing current flows. As a result, the light of the fuel indicator comes on.

According to the present preferred embodiment, the protrusion 37i is preferably arranged to protrude downward from the bottom wall portion 37g of the fuel tank 8 and opposes the throttle body 33a, which defines a air passage. In other words, the protrusion 37i is located in the downward curving space surrounded by the cylinder head 7c, the head cover 7d, the throttle body 33a and the fuel injection valve 33b, thus utilizing the empty space behind the cylinder head 7c. As a result, stable fuel supply can be realized even when the level of the fuel within the fuel tank varies due to traveling on rough terrain, and a desirable tank capacity can be maintained without having to locate the fuel tank 8 at a higher position.

Moreover, besides the protrusion 37i being located in the empty space surrounded by the cylinder head 7c, the head cover 7d, the throttle body 33a and the fuel injection valve 33b, the fuel tank 8 is also located in front of the seat 11 and above the engine unit 7. Thus, it is not likely for the fuel tank 8 to be affected by the engine heat and the increase in temperature of the fuel can be prevented.

According to the present preferred embodiment, since the protrusion 37i is located at approximately the center of the bottom wall portion 37g of the fuel tank 8 along the front-rear direction, cutting of fuel supply by the protrusion 37i can be avoided even when the level of fuel within the fuel tank varies due to traveling on rough terrain or sudden acceleration or deceleration.

The protrusion 37i is preferably located at approximately the center of the bottom surface of the fuel tank along the vehicle width direction, and thus cutting off of fuel supply by the protrusion 37i can be avoided even when the level of fuel within the fuel tank varies. Moreover, the protrusion 37i is preferably wider than the width of the fuel pump along the vehicle width direction, thus the quantity of fuel within the protrusion 37i can be increased.

According to the present preferred embodiment, since the pump installation member 38 is integrally welded to the tank 37 during the blow molding of the tank 37, the strength of the region around the pump connection opening 37e in the tank 37 is increased and the fuel pump 34 supporting strength can be increased. As a result, the adverse effects of vibration and the like on the fuel pump 34 during traveling can be prevented.

According to the present preferred embodiment, since the pump installation member 38 is insert-molded with the plurality of bolts 38b, the flange plate 38a and the resin layer 38c, the strength of the pump installation member 38 can be increased, thereby increasing the strength of the tank 37.

According to the present preferred embodiment, since the outer corner wall surfaces 37c' of the pump connection opening 37e in the upper wall portion 37c of the pump main body 37 decline downward such that they intersect with the upper surfaces 38c" of the resin layer 38c, the diameter of the pump connection opening 37e can be maintained while reducing the vehicle width dimension of the tank 37. The left-right corner wall surfaces 37c' of the tank 37 therefore decline from the immediate border of the left-right upper surfaces 38c" of the resin layer 38c. As a result, the width of the tank can be reduced accordingly and the knee grip c can have a moderate width. Thus, the fuel pump can be located at the knee grip c, thereby providing freedom in design of the fuel tank while maintaining a desirable capacity of the fuel tank. It should be noted that if the width of the tank is increased due to the location of the fuel pump, then the fuel pump will have to be located at regions other than the knee grip, for example, in front of the knee grip, thus reducing the freedom in design. In addition, if the fuel pump is to be located at a region other than the knee grip and yet at the center of the fuel tank, then the capacity of the tank will be decreased.

Moreover, since the left-right wall surfaces 38c' of the resin layer 38c are arranged to decline downward such that the left-right wall surfaces 38c' are continuous with the left-right corner wall surfaces 37c', the width dimension of the tank 37 is reduced and the linear portion required for welding the tank 37 and the resin layer 38c during blow molding can be provided.

According to the present preferred embodiment, the suction vent 46a of the fuel pump 34 is preferably enclosed by the pump cover 48, and the fuel vent 48e is located at a portion opposing the protrusion 37i of the pump cover 48. Thus, suction of air can be prevented by a simple structure without affecting the shape of the tank. When traveling on rough terrain or when the fuel is low, the level of the fuel within the tank 37 varies readily and air might be sucked by the fuel pump 34. According to the present preferred embodiment, since the suction vent 46a is enclosed by one pump cover 48, suction of air can be prevented at a lost cost.

According to the present preferred embodiment, the liquid level detector preferably includes the thermistor 56 and the thermistor casing 57 containing the thermistor 56. In addition, the interior of the thermistor casing 57 is separated into the thermistor housing chamber A, in which the thermistor 56 is housed, and the fuel introduction chamber B, into which fuel within the fuel tank 8 is introduced. Since fuel is introduced into the thermistor housing chamber A through the fuel introduction chamber B, fuel indication can be more precise when the vehicle is in motion or is stationary. There is a possibility that the light of the fuel indicator does not come on even when the fuel is low due to the variation in fuel level within the tank 37. According to the present preferred embodiment, since the variation in fuel level within the tank 37 is prevented from extending to the thermistor housing chamber A, fuel indication becomes more precise.

Further, two fuel vents 58e and 58g are preferably provided at the lower portion of the fuel introduction chamber B while the air vent 57b is provided at the upper portion of the fuel introduction chamber B, such that the sum of the surface areas of the fuel vents 58e and 58g is larger than the surface area of the air vent 57b. Thus, when the fuel becomes low, fuel within the thermistor casing 57 can easily flow out but not in, and fuel indication is more precise.

The above-described preferred embodiments are being set forth using a four wheel vehicle as an example for an all terrain vehicle. However, the present invention can also apply to two wheel vehicles such as motorcycles, or any other vehicle.

While the present invention has been described in detail with respect to preferred embodiments thereof, the foregoing description is in all aspects illustrative and not restrictive. It is understood that numerous other modifications and variations can be devised without departing from the scope of the invention.

What is claimed is:

1. An all terrain vehicle comprising:
   a frame;
   an engine unit suspended from the frame;
   a fuel tank mounted on the frame;
   a fuel pump disposed within the fuel tank and including a fuel suction vent;
   a pump installation member arranged to secure the fuel pump and located in a pump connection opening disposed on a top surface of the fuel tank; and
   an air cleaner arranged under a seat; wherein
   a protrusion protruding in a downward direction is provided on a bottom surface of the fuel tank and at a portion opposing the fuel suction vent of the fuel pump, and the protrusion is arranged so that the protrusion opposes an aspiration passage extending between the air cleaner and the engine unit and in a space defined between a throttle body and a cylinder head cover;
   the protrusion is disposed above all portions of the aspiration passage extending between the air cleaner and the engine unit; and
   the protrusion is located approximately at a center of the bottom surface of the fuel tank along both a front-to-rear direction and a widthwise direction of the vehicle and spaced from both a front and a rear of the fuel tank such that cutting off of a fuel supply is avoided even when a level of the fuel within the fuel tank varies due to traveling on rough terrain or sudden acceleration or deceleration.

2. The vehicle of claim 1, wherein the protrusion is disposed near a center of a bottom surface of the fuel tank along a width direction of the vehicle.

3. The vehicle of claim 1, wherein the fuel tank includes a tank made of blow-molded resin, the pump installation member includes a flange plate made of sheet metal and having a bolt and a resin layer covering the flange plate, the resin layer is adhered to the periphery of the pump connection opening, and a connection portion between the tank and the pump installation member is located on a surface of the fuel tank so as to decline downward.

4. The vehicle of claim 1, further comprising a pump cover arranged to surround the fuel pump and the pump cover includes an opening so that the fuel suction vent of the fuel pump opposes the protrusion.

5. The vehicle of claim 4, further comprising a liquid level detector arranged to detect the level of fuel within the fuel tank, wherein the liquid level detector includes a thermistor and a thermistor casing housing the thermistor, an interior of the thermistor casing is separated into a thermistor housing chamber for housing the thermistor and a fuel introduction chamber into which fuel within the fuel tank is introduced, and the fuel within the fuel tank flows into the thermistor housing chamber through the fuel introduction chamber.

6. The vehicle of claim 5, wherein an opening is respectively provided in a lower portion and an upper portion of the fuel introduction chamber to enable fuel to flow therein, and a surface area of the opening in the lower portion is larger than a surface area of the opening in the upper portion.

7. The vehicle of claim 1, further comprising a liquid level detector arranged to detect the level of fuel within the fuel tank, wherein the liquid level detector includes a thermistor and a thermistor casing housing the thermistor, an interior of the thermistor casing is separated into a thermistor housing chamber for housing the thermistor and a fuel introduction chamber into which fuel within the fuel tank is introduced, and the fuel within the fuel tank flows into the thermistor housing chamber through the fuel introduction chamber.

8. The vehicle of claim 7, wherein an opening is respectively provided in a lower portion and an upper portion of the fuel introduction chamber to enable fuel to flow therein, and a surface area of the opening in the lower portion is larger than a surface area of the opening in the upper portion.

* * * * *